United States Patent [19]

Haeri

[11] Patent Number: 5,659,290

[45] Date of Patent: Aug. 19, 1997

[54] SPEED MINDER

[76] Inventor: Sy Haeri, 5451 Lock Haven Dr., Buena Park, Calif. 90621

[21] Appl. No.: 425,657

[22] Filed: Apr. 20, 1995

[51] Int. Cl.$^6$ ............................................. B60Q 1/00
[52] U.S. Cl. .............................. 340/441; 340/439
[58] Field of Search ........................... 340/441, 671, 340/462, 461, 438, 439; 324/207.25, 167, 168; 364/424.01

[56] References Cited

U.S. PATENT DOCUMENTS

| | | | |
|---|---|---|---|
| 3,611,343 | 10/1971 | Schoenbach | 324/168 |
| 3,728,565 | 4/1973 | O'Callaghan | 340/672 |
| 4,057,712 | 11/1977 | Sakakibara et al. | 340/441 |
| 4,142,152 | 2/1979 | Fincher | 340/463 |
| 4,143,352 | 3/1979 | Janmotz | 340/441 |
| 4,200,816 | 4/1980 | Hopkins | 340/672 |
| 4,223,297 | 9/1980 | Nomura et al. | 340/441 |
| 4,263,590 | 4/1981 | Arnold et al. | 340/672 |
| 4,371,864 | 2/1983 | Kawasaki et al. | 340/670 |
| 4,556,861 | 12/1985 | Hyodo et al. | 340/441 |
| 4,740,905 | 4/1988 | Murakami et al. | 364/424.01 |
| 4,932,244 | 6/1990 | Yamaguchi et al. | 340/462 |
| 5,054,570 | 10/1991 | Naito et al. | 340/441 |
| 5,086,272 | 2/1992 | Hinrichsen | 340/672 |
| 5,422,625 | 6/1995 | Sakaemura | 340/441 |
| 5,424,635 | 6/1995 | Robinson et al. | 324/168 |

*Primary Examiner*—Jeffery Hofsass
*Assistant Examiner*—Mohammed R. Ghannam
*Attorney, Agent, or Firm*—Cleveland R. Williams

[57] ABSTRACT

The present invention relates to a new and improved universal device for vehicles, especially motor vehicles which measures the speed of the vehicle and continuously displays the speed on a digital readout display located in the vicinity of the dashboard of said vehicle. A separate digital switch integrated into the circuitry of the device is used to pre-set a reference speed to a desired value. As the vehicle's actual speed exceeds this pre-set reference value, a buzzer sounds and/or the speed display flashes off and on to alert the driver that he has exceeded the pre-set speed. When the vehicle speed falls below the pre-set limit, the buzzer and flashing stops and the device acts as a regular digital speedometer. The device is adjustable, thus enabling it to be used on a wide variety of vehicles.

19 Claims, 3 Drawing Sheets

SPEED MINDER FUNCTIONAL BLOCK DIAGRAM

SPEED MINDER

BACKGROUND OF THE INVENTION

1. Field of the Invention

This invention relates to a device that continuously measures and displays the speed of a vehicle on a digital readout display located in the vicinity of the vehicle's dashboard. A desired speed is set on a separate digital switch integrated into the circuitry of the device. A plurality of comparators continually compare the set speed with the vehicle's actual speed. As the vehicle's actual speed exceeds the set speed, a buzzer sounds and/or the speed display in the vicinity of the dashboard flashes on and off to alert the driver that he or she has exceeded the set speed. When the vehicle's speed decreases and its speed falls below the set speed, the buzzer and/or flashing display stops and the device acts as a regular digital speedometer.

The signals of the device which indicate vehicle speed are adjustable, thus enabling the device to be adaptable for use on a wide variety of vehicles. For example, the device may be used on motor vehicles such as automobiles, trucks, motorcycles, vehicles such as bicycles or any other vehicle which utilizes a wheel and/or a shaft, e.g., a drive shaft.

Currently most motor vehicles are equipped with a pointer type speedometer to determine the speed of a vehicle. These standard type speedometers normally contain numbers from 0 to about 100 which represent the speed of the vehicle in either miles per hour (MPH) or kilometers per hour (Km/hr). A section of the standard speedometer is usually marked in red, normally at a speed of 55 or above to alert the driver that he or she is exceeding the legal speed limit. This type speedometer system suffers from the disadvantage that requires the driver of the vehicle to periodically glance at the speedometer to check the vehicle speed. This problem creates a potential driving hazard because the driver is not looking at the roadway and observing the driving conditions in the vicinity of the vehicle, including stop signs and lights, other vehicles, etc.

More recently, the automotive industry has installed digital speedometers in a selected few of their vehicles. These digital speedometers suffer from the same disadvantages accorded to the pointer type speedometers, because they are not equipped to alert the driver when the vehicle speed surpasses a pre-set, desired upper speed.

The instant, Speed Minder, solves the above-described problems by alerting the vehicle driver when the vehicle exceeds a pre-determined upper speed limit.

As can be determined from the foregoing, there is a need for a device that will physically alert a driver of a vehicle that the vehicle is exceeding a pre-determined speed limit, e.g., by an audible alarm and/or flashing lights on the digital read-out panel.

2. Description of the Prior Art

Several attempts have been made in the past to develop speed sensing devices for motor vehicles and devices to alert the driver of a motor vehicle when the vehicle exceeds a pre-determined speed.

For example, U.S. Pat. No. 3,728,565 to O'Callaghan, relates to a device for sensing the direction of rotation and the speed of a shaft. The device includes a two-phase AC generator having a rotor attachable to a shaft and rotatable therewith and a first and second spaced apart starter winding which are adapted to have first and second sinusoidal voltages established in response to rotation of the rotor with the shaft.

U.S. Pat. No. 4,142,152 to Fincher discloses a directional sensing apparatus containing a rotatable member having a plurality of permanent magnets which magnetically influence a first and second spaced stationary sensor. The rotation of the member causes the magnets to sequentially operate the first and second sensors so that neither, either or both are actuated.

U.S. Pat. No. 4,143,352 to Joarmatz describes an audible speed indicator for motor vehicles which contains two pulse trains, one of which varies as a function of vehicle speed and the other which varies as a function of a desired speed which is manually set. When the actual speed increases to a value greater than the set speed an audio alarm sounds.

U.S. Pat. No. 4,200,816 to Hopkins relates to a wheel speed sensor which is described as suitable for sensing the angular velocity of a rotating body such as a vehicle wheel. The device contains a sensing device which requires only a single coil for generating an electrical signal through said coil. The rotation sensor provides an output signal suitable for use in an anti-lock system on a motor vehicle.

U.S. Pat. No. 4,223,297 to Nomura et al discloses a speed alarm system for a motor vehicle which consists of a speed sensor, a plurality of comparators responsive to the vehicle speed and a pre-set speed. When the vehicle speed exceeds a pre-set speed an alarm signal step wise energizes a number of lamps in accordance with the difference between the vehicle speed and the pre-set speed.

U.S. Pat. No. 4,371,864 to Kawasaki et al discloses a digital display device which is described as suitable for controlling other vehicle mounted electric equipment such as a warning device, Automatic door lock, etc.

U.S. Pat. No. 5,086,272 to Hinricksen relates to a motion-direction detector utilizing passive magnetic induction sensors. The sensors are disposed adjacent to the path of magnetic variations of a moving part to determine the motion-direction of said part.

As can readily be determined from the foregoing, there is an ongoing research effort to produce new and novel devices to determine the speed of moving objects, for example, motor vehicles, and to provide the vehicle operators with a type of alarm or the like for said vehicle.

SUMMARY OF THE INVENTION

The present invention resides in a universal speed alarm system for a vehicle that is capable of being calibrated comprising a vehicle speed sensor which generates a series of electrical pulses, means for adjusting the frequency of the electrical pulses generated, a plurality of comparators responsive to the vehicle speed and to a pre-set reference speed, an audio alarm and a visual alarm, both responsive to the out-put signals from the comparators.

BRIEF DESCRIPTION OF THE DRAWINGS

The invention is further described by reference to the appended drawings taken in conjunction with the following description where.

DETAILED DESCRIPTION OF THE INVENTION

This invention resides in a universal device that is suitable for use on a variety of motor vehicles, which alerts the vehicle operator with audio and visual alarms when the vehicle speed exceeds that of a pre-determined speed.

Figure 1:
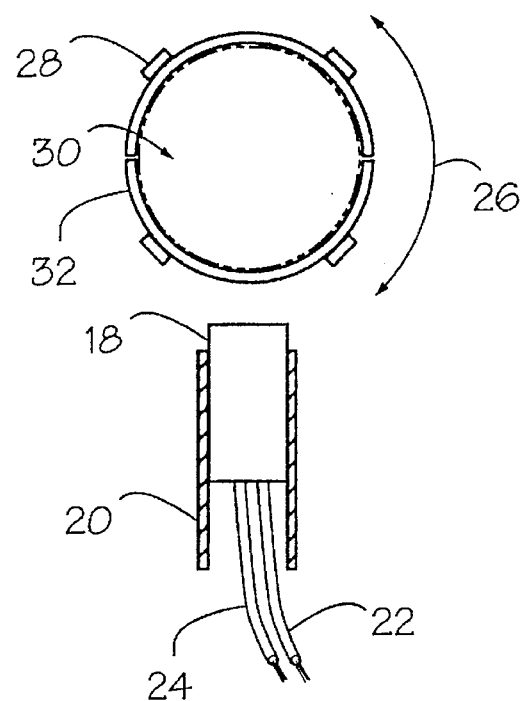
FIG. 1 is a frontal, cut away drawing depicting the reed switch sensor, four magnets and the directions of rotation of the axle of the drive shaft upon which the magnets are located. Preferably, the magnets are spaced at an angle of 90 degrees from each other, or in the alternative at an equal distance from each other. The reed switch sensor occupies a stationary position that is a small distance away from the magnets.

FIG. 1 is a frontal view of magnetic proximity sensor 18, which comprises a reed switch sensor 18 surrounded by a non magnetic metal sleeve 20, for example, copper, aluminum, etc. Magnetic proximity sensor 18 is permanently anchored at a spacial distance from magnets 18 of from about ¼ inch to about 3 inches preferably ¼ inch to about 1 inch.

It should be noted that the distance of the sensor from the magnets is governed by the strength of the magnetic field generated by the magnets and the ability of said magnet to open and close magnetic proximity sensor 18. Magnetic proximity sensor 18 is a magnetic reed switch sensor which is encapsulated in a hermetically sealed glass tube ensuring a clean atmosphere performance that is unaffected by dust, moisture, rust, corrosion, oxidation, chemicals, shock, vibration, or explosives in the environment. The sealed glass tube may be further encapsulated with a rubber or plastic type material that is water resistant.

Electrical wires 22 and 24 lead into and out of reed switch sensor 18 and carry an electrical current to said reed switch.

The interior of reed switch sensor 18 comprises two separate small strips of magnetic metal, one of which is attached to electrical wire 22 and the other of which is attached to electrical wire 24. The reed switch sensor can be of two designs, namely (1) the two strips of magnetic metal are separated by a small gap that prevents the electrical current in wires 22 and 24 from completing an electrical circuit, or (2) the two magnetic strips of metal continuously touch each other providing a continuous electrical current through said reed switch sensor 18.

A plurality of magnets 28 rotating around the axis of vehicle, drive shaft 30 in direction 26 are in close proximity to reed switch sensor 18 and cause the reed switch to either close and open, example (1) above or open and close, example (2) above.

This action sends a series of electrical pulses from reed switch sensor 18, through the system of the Speed Minder herein. The preferred reed switch sensor 18 for use herein comprises the sensor described in example (1) above where the two separate magnetic strips of metal have a small gap between said metals.

A plurality of magnets 28 are permanently attached to vehicle drive shaft 30. Preferably, the plurality of magnets 28 comprise 4 magnets spaced approximately equal distance apart. It should be noted that the number of magnets useful herein can be less than 4 or greater than 4.

Vehicle, drive shaft 30 can be either a half shaft for a front wheel drive vehicle, a half shaft for a rear wheel drive vehicle or a drive shaft for a rear wheel drive vehicle. The plurality of magnets can be attached to drive shaft 30 in a number of ways, for example, the magnets 28 can be attached to the vehicle using an adhesive that is especially formulated for use in adverse weather conditions. Magnets 18 can be attached to drive shaft 30 using a plastic sleeve with groves to receive said magnets, said sleeve being especially designed to fit around drive shaft 30. Another method of anchoring magnets 28 to drive shaft 30 comprises a specially designed velcrose sleeve containing said magnets, said velcrose assembly being permanently attached to drive shaft 30. Yet another method of attaching the magnets to said drive shaft comprises using a piece of plastic tape containing an adhesive on both sides, such as those manufactured by the 3M Company. Vehicle, drive shaft 30 can rotate in either direction 26 as depicted in FIG. 1.

Figure 2:
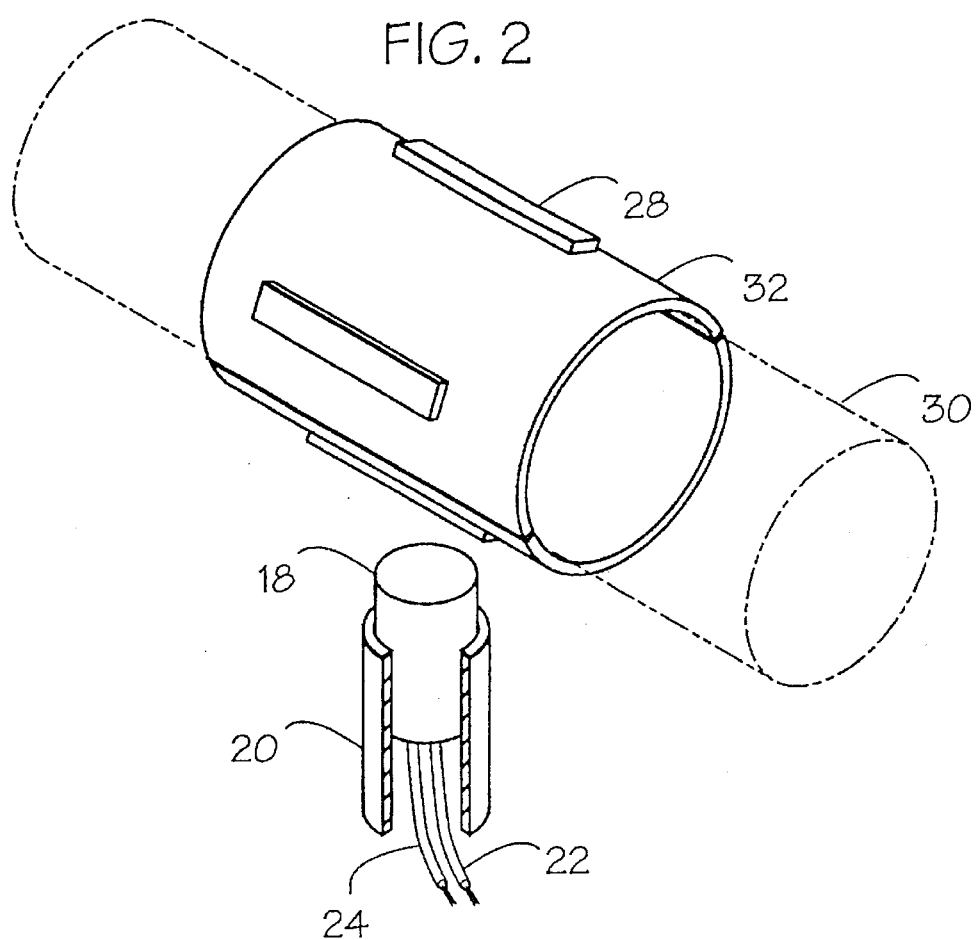
FIG. 2 is a frontal perspective drawing of FIG. 1 which depicts the spacial arrangement of the reed switch sensor and the magnets around a vehicle drive shaft.

FIG. 2 is a perspective view of FIG. 1 which better depicts the spacial arrangements of the proximity of reed switch sensor 18 including non metallic sleeve 20 to drive shaft 30 and the plurality of magnets 28. Otherwise, the descriptions and definitions of FIG. 1 apply to the drawing depicted in FIG. 2.

It should be noted that the electrical pulses or signals emitted from magnetic reed sensor 18 can be calibrated or adjusted. This calibration or adjustment of the input signal from magnetic reed sensor 18 renders the Speed Minder device, universal in application. Previously, all vehicles with digital type speedometers were calibrated or adjusted at the factory and are not adjustable after the vehicle leaves the factory. This problem is solved by the present invention, rendering the device suitable for use on a wide variety of vehicles.

Figure 3:
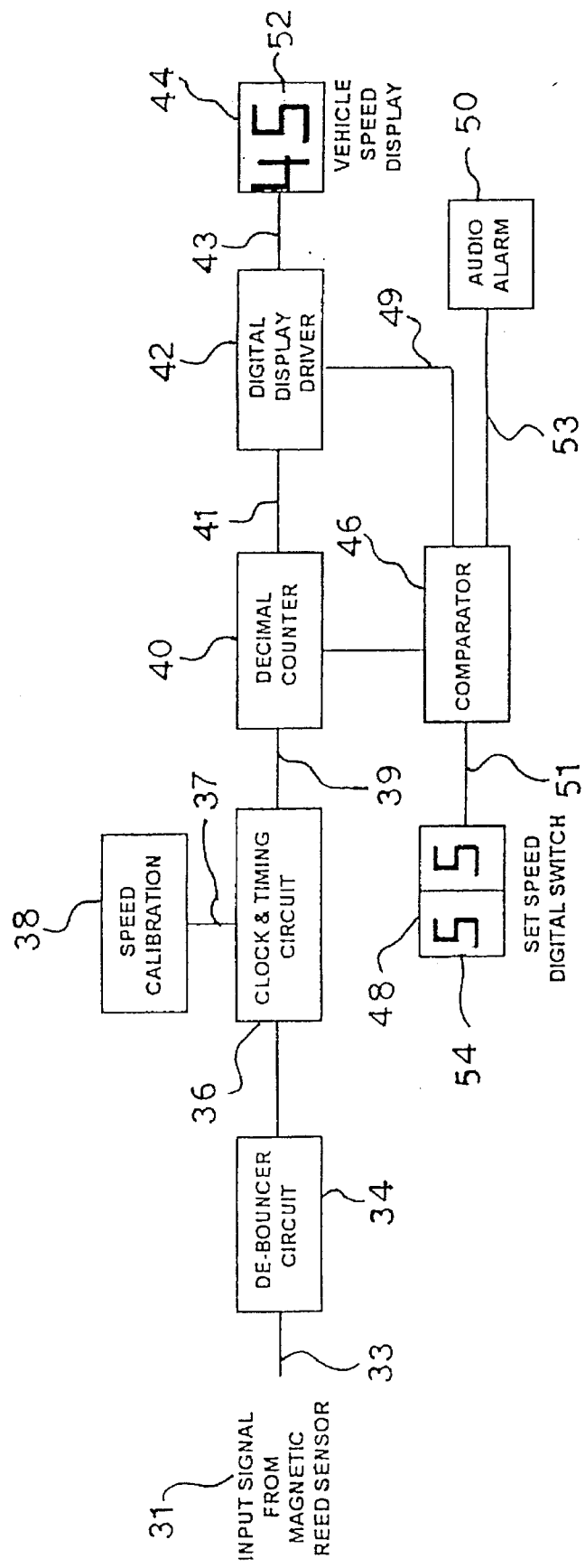
FIG. 3 shows a schematic block diagram depicting a preferred embodiment of the Speed Minder system according to the invention herein.

FIG. 3 is a functional block diagram of the Speed Minder herein. Input signal 31 is a series of electrical pulses generated from magnetic reed sensor 18, e.g. from FIGS. 1 and 2 which are caused when magnets 28 attached to drive shaft 30 rotate in direction 26 which would represent either a forward speed or reverse speed according to the direction the vehicle is being driven, e.g., also from FIGS. 1 and 2. Magnets 28 attached to drive shaft 30 rotate near magnetic reed sensor 18; causing metallic, magnetic strips located in said reed sensor to open and close thus emitting a series of electrical pulses as an input signal 32. Input signal 31 is transported via conduit 33 to de-bouncer circuit 34, where false signals are eliminated. False signals can be generated when magnetic reed sensor, e.g. FIG. 1, fails to open or close properly as the plurality of magnets rotate around the axis of drive shaft 30.

The signal from de-bouncer circuit 34 is transported through conduit 35 to clock and timing circuit 36 where the number of electrical pulses per unit of time, for example the number of pulses per second are clocked and timed. For purposes of clarification herein, conduits mean electrical wires or an electrical circuit capable of transporting an electrical current.

Speed calibration unit 38 is connected to clock and timing circuit 36 via conduit 37. Speed calibration unit 38 is a potentiometer which can adjust the frequency of the electrical pulses received by clock and timing circuit 36 by either increasing or decreasing the number or frequency of electrical pulses per second received by clock and timing circuit 36. This calibration unit renders the Speed Minder universal in use. Thus, the Speed Minder can be used on a wide variety of vehicles which have wheels and/or drive shafts of varying diameters. The vehicle's actual speed reported on vehicle speed display 44 via digital numerals 52 is adjustable to approximate the vehicle's speed as reported on the vehicle's factory calibrated speedometer.

The signal from clock and timing circuit 36 is transported via conduit 39 to binary coded decimal counter (BCD) 40.

Digital display driver 42 receives the signal from binary coded decimal counter 40 through conduit 41 where the signal is converted to decimal numerals for use in vehicle display unit 44 which displays digital numerals 52 as lighted digital numerals. A plurality of comparators 46, receive signals from binary coded decimal counter 40 via conduit 47 and from set speed digital switch 54. Normally, one comparator is needed for each digital numeral displayed on the vehicle speed display and for each digital numeral displayed on the set speed digital switch. For example, the current system as displayed in FIG. 3 would need two (2) comparators e.g. a separate comparator or plurality of comparators for digital numerals displayed on the vehicle's actual speed digital display and a separate comparator or plurality of comparators for the digital numerals displayed on the vehicle's reference, pre-set digital switch. It should be noted that the plurality of comparators herein can exceed two. For example, two (2) to six (6) comparators may be used. Signals transported from set speed digital switch 48 through conduit 51 and from decimal counter 40 through conduit 47 to comparators 46 are constantly compared by comparators 46. When the actual speed of the motor vehicle as reported by vehicle speed display 44 is greater than the set speed as reported on the set speed digital switch, comparators 46 send out an output, alarm signal through conduit 49 to vehicle speed display 44 and audio alarm 50 through conduit 53. The alarm signal to vehicle speed display 44 causes digital numerals 52 to flash off and on. Similarly, the alarm signal from comparator 46 to audio alarm 50 causes a buzzer to sound. The frequency or number of times the buzzer sounds per unit of time increases as the vehicle's actual speed increases in a linear progression above the pre-set reference speed.

Figure 4:
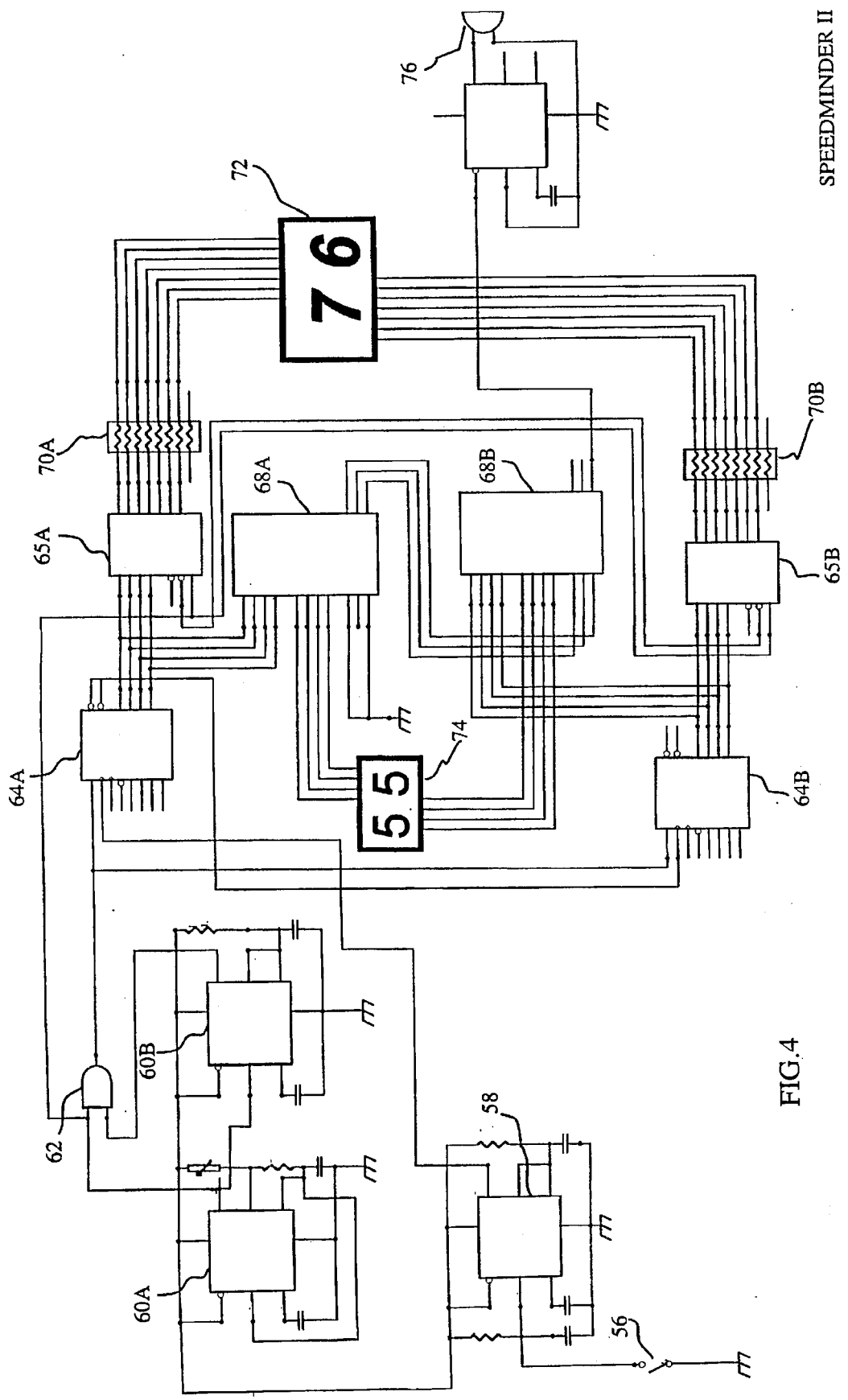
FIG. 4 is a schematic illustration which illustrates in greater detail the circuitry utilized in conjunction with the present invention.

FIG. 4 is a detailed illustration in greater detail of the circuitry utilized in the schematic block diagram depicted in FIG. 3.

Magnetic reed switch 56 transmits electrical pulses to debouncer 58. A signal from debouncer 58 is conveyed to clock and timing circuits 60A and 60B. Potentiometer 62 calibrates the frequency of electrical pulses which is transmitted to binary coded decimal counters 64A and 64B.

Digital display drivers 65A and 65B receives signals from the binary coded decimal counters and transmits a signal to digital speed display unit 72. Comparators 68A and 68B receive signals from binary coded decimal counters 65A and 65B and from set digital speed 74. When the actual speed of the vehicle, exceeds the set reference speed for the vehicle, the comparators transmit an output signal which activates buzzer 76 and causes digital display 72 to flash off and on. Resistors 70A and 70B regulate the amount of electrical current received by vehicle speed display 72 from digital display drivers 65A and 65B. It should be noted that the detailed description of the Speed Minder functional block diagram described in FIG. 3 is applicable to the circuitry diagram detailed in FIG. 4.

Obviously, many modifications and variations of the invention, as hereinbefore set forth, may be made without departing from the spirit and scope thereof, and therefore, only such limitations should be imposed as are indicated in the appended claims.

I claim:

1. A universal, digital speedometer and speed alarm system for vehicles which comprises:
    (A) means for generating a signal indicative of a vehicle's speed;
    (B) means for calibrating the signal generated in step (A) above;
    (C) display means for displaying the vehicle's actual speed;
    (D) means for pre-setting a reference speed for the vehicle;
    (E) a plurality of comparators responsive to both the vehicles actual speed and the vehicles pre-set reference speed;
    (F) an audio alarm responsive to an output signal from said comparators, wherein the audio alarm comprises a buzzer which sounds then stops and continues to repeat itself so long as the vehicle's actual speed exceeds the vehicle's pre-set, reference speed, the frequency of which increases per unit of time as the vehicle's actual speed increases in a linear progression above the pre-set reference speed; and
    (G) a visual alarm responsive to an output signal from said comparators.

2. The universal, digital speedometer and speed alarm system according to claim 1, wherein the means for generating the signal in step (A) comprises a plurality of magnets attached to the vehicle drive shaft located about equal distances apart from each other and a magnetic proximity sensor located near the drive shaft, said magnetic proximity sensor being connected to a source of energy.

3. The universal, digital speedometer and speed alarm system of claim 2 wherein the magnetic proximity sensor is encapsulated in a hermetically sealed glass tube and a coating of plastic.

4. The universal, digital speedometer and speed alarm system according to claim 2 wherein the magnetic proximity sensor opens and closes in response to the magnets which rotate with the vehicle's drive shaft generating a series of electrical pulses.

5. The universal, digital speedometer and speed alarm system in accordance with claim 1, including a debouncer to eliminate false signals produced by a magnetic proximity sensor.

6. The universal, digital speedometer and speed alarm system of claim 1, wherein the means for calibrating the signal in step (B) comprises a potentiometer.

7. The universal, digital speedometer and speed alarm system of claim 1, wherein the means for displaying the vehicle's actual speed in step (C) is a digital display unit.

8. The universal, digital speedometer and speed alarm system of claim 1, wherein the means for pre-setting the reference speed for the vehicle in step (D) is a digital switch.

9. The universal, digital speedometer and speed alarm system of claim 1, wherein the comparators generate an output signal responsive to the vehicle's actual speed being greater than the set speed, said output signal being directed to an audio alarm and a visual alarm.

10. The universal, digital speedometer and speed alarm system of claim 1, wherein the audio alarm system in step (F) comprises a buzzer.

11. The universal, digital speedometer and speed alarm system of claim 1, wherein the visual alarm system in step (G) comprises the digital display unit flashing off and on.

12. A universal, digital speedometer and speed alarm system for vehicles which comprises: four magnets attached to a vehicle's drive shaft; a magnetic reed sensor connected to an electrical source and located in close proximity to the magnets wherein the magnetic reed sensor transmits a series of electrical pulses in response to the magnets as they rotate with the shaft of a moving vehicle; a debouncer to eliminate false signals from the reed sensor; a calibration unit for adjusting the frequency of the electrical pulses per unit of time emitted by the magnetic reed sensor; an internal clock and timing unit for said electrical impulses; a decimal counter to count the number of pulses transmitted by the reed sensor; a digital display driver responsive to a signal transmitted from the decimal counter, said digital display driver sending an electrical transmission to a digital display unit to provide a digital display of the vehicle's actual speed; a digital switch to provide a pre-set reference speed; and, a plurality of comparators responsive to signals of the actual speed and the pre-set speed of the vehicle, each of said comparators producing an output signal when the vehicle's actual speed exceeds the pre-set speed, said output signals activating an audio alarm and a visual alarm, wherein the audio alarm comprises a buzzer which sounds then stops and continues to repeat itself so long as the vehicle's actual speed exceeds the vehicle's pre-set, reference speed, the frequency of which increases per unit of time as the vehicle's actual speed increases in a linear progression above the pre-set reference speed.

13. The universal, digital speedometer and speed alarm system of claim 12, wherein the vehicle's drive shaft is a half-shaft for either front wheel drive or rear wheel drive vehicles.

14. The universal, digital speedometer and speed alarm system of claim 12, wherein the vehicle's drive shaft is a drive shaft for rear wheel drive vehicles.

15. The universal, digital speedometer and speed alarm system according to claim 12, wherein the reed sensor comprises a magnetic switch which opens and closes in response to rotating magnets located on the vehicle's drive shaft.

16. The universal, digital speedometer and speed alarm system according to claim 12, wherein the calibration unit comprises a potentiometer.

17. The universal, digital speedometer and speed alarm system of claim 12, wherein the plurality of comparators comprise a separate comparator for digital numerals displayed on the vehicle's actual speed digital display and a separate comparator for the digital numerals displayed on the vehicle's reference, pre-set digital switch.

18. The universal, digital speedometer and speed alarm system according to claim 12, wherein the visual alarm system causes the digital display's numerals to flash on and off in response to output signals from the comparators indicating that the vehicle's actual speed has surpassed the pre-set reference speed of the digital switch.

19. A universal, digital speedometer for vehicles which comprises: four magnets attached to a vehicle's drive shaft; a magnetic reed sensor connected to an electrical source and located in close proximity to the magnets wherein the magnet reed sensor transmits a series of electrical pulses in response to the magnets as they rotate with the shaft of a moving vehicle; a debouncer to eliminate false signals from the reed sensor; a calibration unit for adjusting the frequency of the electrical pulses per unit of time emitted by the magnetic reed sensor; an internal clock and timing unit for said electrical impulses; a decimal counter to count the number of pulses transmitted by the reed sensor; and a digital display driver responsive to a signal transmitted from the decimal counter, said digital display driver sending an electrical transmission to a digital display unit to provide a digital display of the vehicle's actual speed; a digital switch to provide a pre-set reference speed; and, separate comparators responsive to signals fo the actual speed and the pre-set speed of the vehicle, each of said comparators producing an output signal when the vehicle's actual speed exceeds the pre-set speed, said output signals activating an audio alarm and a visual alarm; wherein the audio alarm comprises a buzzer which sounds then stops and continues to repeat itself so long as the vehicle's pre-set, reference speed, the frequency of which increases per unit of time as the vehicle's actual speed increases in a linear progression above the pre-set reference speed.

\* \* \* \* \*